Aug. 25, 1959  A. B. ANDERSON  2,901,303
AUTO MECHANIC'S TRAY
Filed Jan. 4, 1955

INVENTOR.
Arthur B. Anderson
BY
Olson & Trexler
Attys.

United States Patent Office 2,901,303
Patented Aug. 25, 1959

2,901,303
AUTO MECHANIC'S TRAY

Arthur B. Anderson, Chicago, Ill.

Application January 4, 1955, Serial No. 479,764

5 Claims. (Cl. 311—21)

This invention is concerned generally with the repairing of automobiles, and more particularly with a mechanic's tray for holding tools.

Present day automotive design is rendering it constantly more difficult for mechanics to work on the automobiles. Specifically, the space under the hood is becoming more and more crowded due to the prevalence of short, low hoods, wide V–8 engines, power brakes and power steering, and more recently air conditioning apparatus. Thus, there is no space left in the engine compartment for a mechanic to place his tools while working on the engine or the various accessories under the hood.

In the past, mechanics, after raising the hood of an automobile, have often laid a cloth over a portion of a fender, and have laid their tools on this cloth. However, in the more recent automobiles there is very rarely any substantial flat area, or even approximately flat area, on the fenders. Therefore, the tools cannot be placed on the fender while a mechanic is working under the hood.

Accordingly, it is an object of this invention to provide a tray which is readily attachable to the front of an automobile after raising the hood thereof for supporting a mechanic's tools.

More specifically, it is an object of this invention to provide a tray for holding mechanics' tools which is securely attached to an automobile without the necessity of any addition to or alteration of any parts of the automobile.

It is a more particular object of this invention to provide a tray for holding an auto mechanic's tools which is held on the automobile by means of the hood-latching mechanism thereof.

A further object of this invention is to provide an auto mechanic's tool carrying tray readily mounted at the front of the engine compartment and serving to anchor corners of drop cloths placed over the fenders to preclude damage to the finish of the automobile.

Other and further objects and advantages of the present invention will be apparent from the following description, when taken in connection with the accompanying drawings, wherein.

Figure 1:
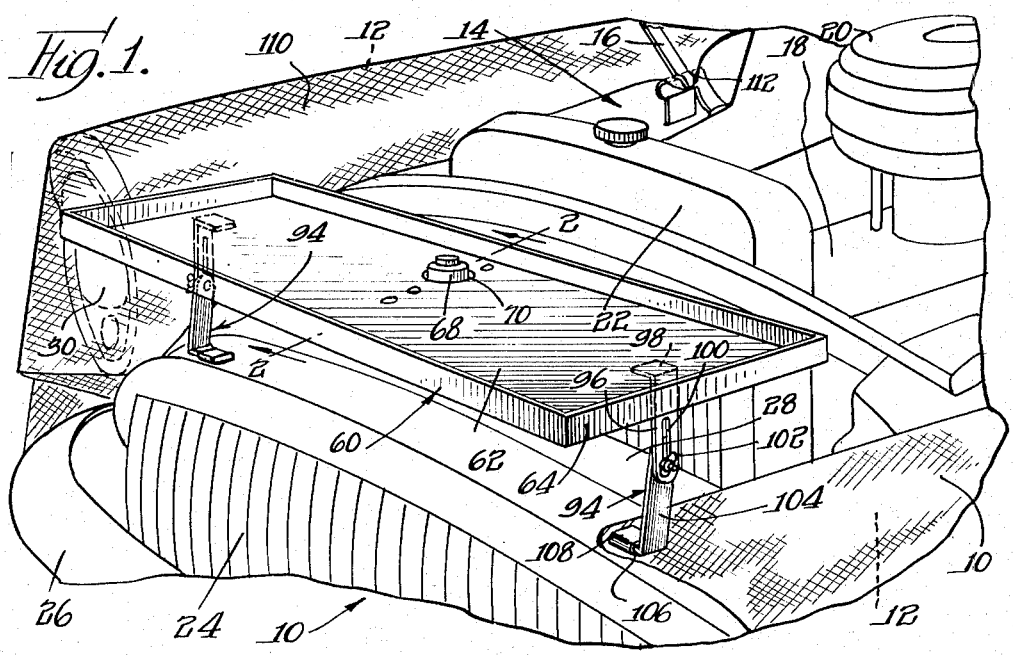
Fig. 1 is a perspective view showing the tray of my invention mounted at the front of an automobile engine compartment.

Referring now in greater particularity to the drawings, there will be seen a portion of an automobile 10 having fenders 12 lying on either side of an engine compartment 14. A hood (not shown) closes between the fenders and is held in raised position by spring loaded arms 16. The usual automotive components are found in the engine compartment 14 including an engine 18 having a carburetor and air cleaner 20, and a radiator 22. A grill 24 extends across the front of the automobile between the fenders and above a bumper 26. A sheet metal frame member 28 extends across the front of the automobile above the grill 24. Headlights 30 are mounted in the fenders in accordance with conventional practice.

The sheet metal frame member 28 (it being understood that this member is made of heavy gauge sheet metal, not to be confused with the sheet metal of the body) carries at the center of the automobile a hood latching mechanism, identified generally by the numeral 32. The hood latching mechanism includes an inverted, generally U-shaped support 34 having a bight portion 36 in the form of a flat roof or wall, depending legs 38 which are outwardly tapered in part, and which terminate in outwardly directed flanges 40 which are secured to the frame member 28 by any suitable means such as nuts and bolts 42. The top wall or bight portion 36 is provided with a circular aperture 44, and an L-shaped latch member 46 is pivotally mounted to extend across this hole or opening.

The latch member 46 is pivoted at the outer end of one of the legs as is indicated at 48 to the top wall 36. The portion of this leg near the heel of the L extends across the opening 44, and the opposite arm or leg 50 extends outwardly through a horizontal slot 52 in the depending leg 38 of the support 34.

Figure 2:
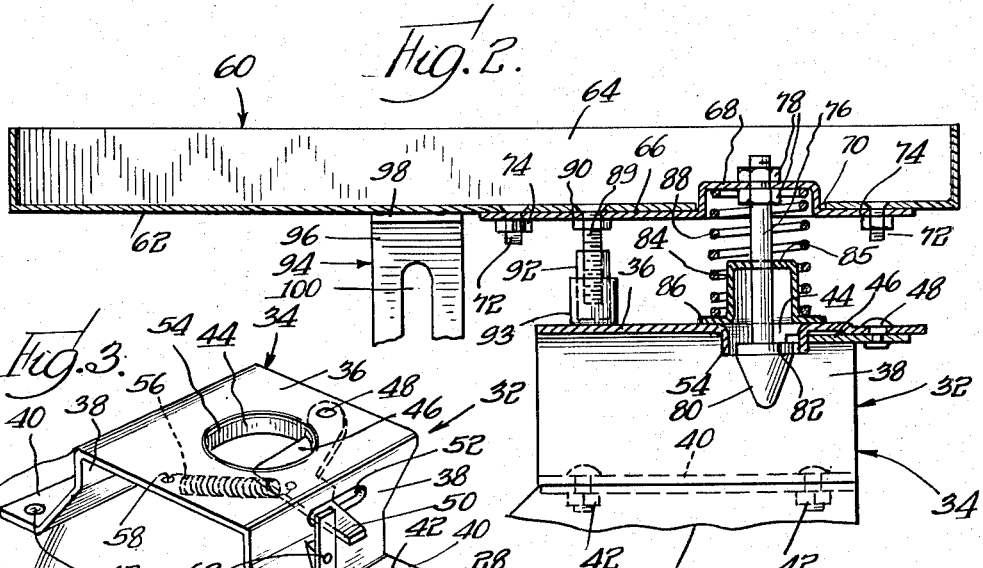
Fig. 2 is a vertical sectional view through the tray and mounting means therefor as taken substantially along the line 2—2 of Fig. 1.
Figure 3:
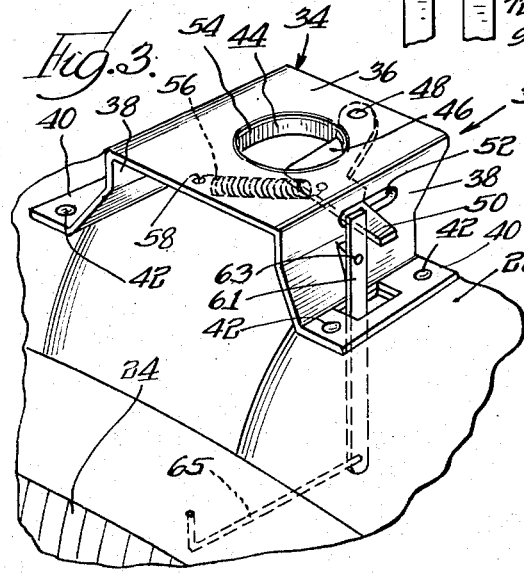
Fig. 3 is a perspective view of the latching mechanism of the automobile which is utilized for mounting the tray.

It will be observed particularly in Fig. 2 that the aperture 44 is defined by a down-turned rim or neck 54, this rim or neck being cut away to accommodate the L-shaped latch member 46. A tensioned spring 56 extends between the L-shaped latch member 46 and a hole 58 in the top wall 36 of the support 34 to urge the latch member into the aperture 44, such movement being limited by abutment of the projecting arm 50 against the edge of the horizontal slot 52.

An elongated latch release bar 61 is pivotally mounted on the side of one of the legs 38 as at 63 with the upper end of the bar positioned in engagement with the projecting end 50 of the latch member. A wire or similar pull member 65 is connected to the bottom end of the bar 61 and is accessible through the grill 24. Pulling on the member 65 causes pivoting of the release member 61, and this pushes back on the extending arm 50 to retract the latch 46 from its position subtending the aperture 44. All of the foregoing structure is present on the automobile as a part of its normal equipment, although the latching mechanism may vary somewhat from one make or model to another.

The mechanic's tray forming the subject matter of the present invention is identified generally by the numeral 60 and comprises a flat bed or supporting surface 62 having an upstanding peripheral wall 64. The tray conveniently is of rectangular configuration and is of substantially the same width as the engine compartment. The tray is provided on its undersurface with an attaching plate 66 having a raised boss 68 extending through an opening 70 in the plate or supporting surface 62. Machine screws 72 which preferably are countersunk in the plate or supporting surface 62 extend through the attaching plate 66 and nuts 74 threaded thereon hold the attaching plate 66 to the wall or supporting surface 62.

A stud 76 is mounted in the boss 68 by means of a pair of nuts 78 threaded on the stud on opposite sides of the boss. The stud is capable of vertical adjustment by means of the nuts 78. The opposite end of the stud is provided with a generally conical head 80 having a rounded tip, and having a latching shoulder or surface 82. A thimble 84 surrounds the stud 76, the head 85 of the thimble being suitably apertured for this purpose. The thimble opens downwardly and is provided about its open end with an outwardly directed flange 86. A coil spring 88 is seated in the boss 68 and also seats against the flange 86 of the thimble, normally urging the thimble down about the head 80.

A levelling bolt 89 is secured to the supporting surface 62 and the plate 66, preferably being countersunk, by means of a lock nut 90 threaded on the levelling screw and abutting the plate 66. A sleeve nut 92 is mounted on the lower end of the screw and carries a rubber foot or bumper 93. The rubber foot or bumper is adjustable up and down on the screw by virtue of the sleeve nut 92.

Adjacent the opposite sides of the tray 60 there is provided a pair of adjustable supporting legs 94. These legs are of similar construction and each comprises an upper leg portion 96 having a right angularly disposed flange or foot 98 welded to the undersurface of the tray. Each upper leg portion 96 is provided with a vertical slot 100. Through each vertical slot 100 there projects a bolt having a wing nut 102 thereon, and a lower leg portion 104 is pivotally mounted on this bolt. Each lower leg portion 104 is provided with a right angularly disposed foot 106 at its outer end having thereon a rubber boot or bumper 108.

It is extremely simple to position the tray in operative position after the hood of the automobile has been raised. The head 80 of the stud 76 is pushed down through the opening 44 in the top of the latching mechanism. The rounded conical shape of the head facilities insertion of the head through the opening. The thimble 84 moves back against the spring 88 as will be apparent, and the latch member 46 engages behind the shoulder 82 of the stud head as best may be seen in Fig. 2. The sleeve nut 92 may be adjusted to cause the rubber bumper 93 to abut the top surface 36 of the latch mechanism for levelling the tray from front to rear of the automobile. It will be understood that for any given model automobile, this adjustment will have to be made only once.

The legs 94 are moved into position to cause the boots 108 on the feet 106 to rest on top of the grill 24, the lower legs 108 being pivoted for this purpose about the mounting bolts, and the bolts being slid up or down in the slots 100 as need be. The wing nuts 102 then are tightened on the bolts to lock the legs in adjusted position. The legs serve to level and support the tray from side to side.

The legs 94 also are useful for supporting a pair of drop cloths 110 on the fenders. As may be seen, the front corner, or any other front portion of each drop cloth 110 is clamped against the top of the grill 24 by means of one of the boots 108 on the feet 106. A rear portion of each drop cloth 110 may be snagged behind the supporting brace 16 of the hood, as is indicated at 112.

When it is desired to remove the tray from the automobile, all that is necessary is to pull on the member 64 to release the latch member 46 of the hood latch. The tray then is free of restraint and is raised partially from its seated position by the spring 88 so that the stud head 80 is no longer restrained by the latch member. The tray then can be lifted from the automobile, the drop cloths can be removed, and the hood can be closed.

It will be apparent that the tray herein shown and described is attached to and removed from an automobile with the utmost facility. The tray is positioned conveniently for supporting tools, and serves also to support drop cloths, so that the finish on the fenders will not be marred in any way. The tray is firm and secure when in mounted position, and yet will not require any adjustment following the initial one as long as it is used on the same model automobile. Adjustments for use on different models, or even on different makes of automobiles may be made quite easily. It is apparent that the tray readily can be mounted in perfectly level position so that the mechanic will not be troubled by tools or parts of a cylindrical or a spherical nature rolling to the lowest edge of the tray.

It will be apparent that the attaching structure of my tray would be modified somewhat for co-operation with the latching mechanisms of automobiles of different brands. Other and further structural changes from the specific illustrative example herein shown and described will no doubt occur to those skilled in the art, and are to be understood as forming a part of my invention insofar as they fall within the spirit and scope of the appended claims.

I claim:

1. A supporting tray for use with an automobile hood latching mechanism including an apertured horizontal plate and latch member biased to traverse at least a portion of the aperture; and comprising an elongated supporting member having a substantially centrally disposed opening therethrough, an attachment plate secured to said supporting member and including a cup-shaped portion projecting through said opening, an attachment member depending from said cup-shaped portion and having shoulder means at the lower end thereof with which the latch member is adapted to cooperate when passed through the aperture in the plate of the hood latching mechanism, means on said attachment member bearing against the cup-shaped portion and the plate of the hood latching mechanism tending to normally maintain the supporting tray elevated thereabove, and supporting leg means on the tray adapted to bear against adjacent portions of the automobile for supporting the tray in stable position.

2. A supporting tray for use with an automobile hood latching mechanism including an apertured horizontal plate and a latch member biased to traverse at least a portion of the aperture; and comprising a supporting member, an attachment member depending from said supporting member and having shoulder means at the lower end thereof for cooperation with the latch member of the hood latching mechanism when passed through the aperture in the horizontal plate, spring means on the attachment member normally maintaining the supporting tray elevated above the horizontal plate of the hood latching mechanism, and adjustable leveling means depending from said tray for abutment with an adjacent portion of the automobile to initially level the tray with respect thereto and cooperate with said attachment member in supporting the tray in leveled position.

3. A supporting tray as claimed in claim 2, wherein the adjustable leveling means is disposed adjacent said attachment member and includes a bolt depending from the tray and threadedly carrying a foot for abutting engagement with the horizontal plate of the hood latching mechanism to initially level the tray with respect thereto.

4. A supporting tray for use with an automobile hood latching mechanism including an apertured horizontal plate and a latch member biased to traverse at least a portion of the aperture; and comprising a supporting member, an attachment member fixedly secured to the supporting member and depending therefrom in rigid right-angled position with respect thereto, said attachment member having shoulder means at the lower end thereof for cooperation with the latch member on the hood latching mechanism when the attachment member is passed through the aperture in the horizontal plate of the hood latching mechanism, spring means on said attachment member normally maintaining the supporting tray elevated above the horizontal plate of the hood latching mechanism, and leg means depending from said tray in spaced relation with respect to the attachment member and adapted for abutment with an adjacent portion of the automobile to initially level the tray and cooperate with said attachment member in supporting the tray in level position permitting the tray to bear weight throughout the extent thereof without tilting.

5. A supporting tray as claimed in claim 4, wherein the leg means comprises a pair of legs depending from said tray and spaced from the attachment member and a stop means located relatively close to said attachment member adapted for abutting engagement with the horizontal plate of the hood latching mechanism to resist depression of the spring means supporting the tray upon application of weight thereto.

References Cited in the file of this patent

UNITED STATES PATENTS

| | | |
|---|---|---|
| 937,480 | Smith et al. | Oct. 19, 1909 |
| 1,480,052 | Epley | Jan. 8, 1924 |
| 1,723,238 | Hoot | Aug. 6, 1929 |
| 1,794,638 | Mueller | Mar. 31, 1931 |
| 1,938,739 | Coombes | Oct. 19, 1931 |
| 2,286,736 | Hill et al. | June 16, 1942 |
| 2,286,739 | Krause | June 16, 1942 |
| 2,510,436 | Trammell | June 6, 1950 |
| 2,549,021 | Setchell | Apr. 17, 1951 |
| 2,718,445 | Wilson | Sept. 20, 1955 |
| 2,805,778 | Yordi | Sept. 10, 1957 |